March 29, 1960  B. R. SWARTS  2,930,289
ELECTRODE DRESSER
Filed Jan. 23, 1956  3 Sheets-Sheet 1
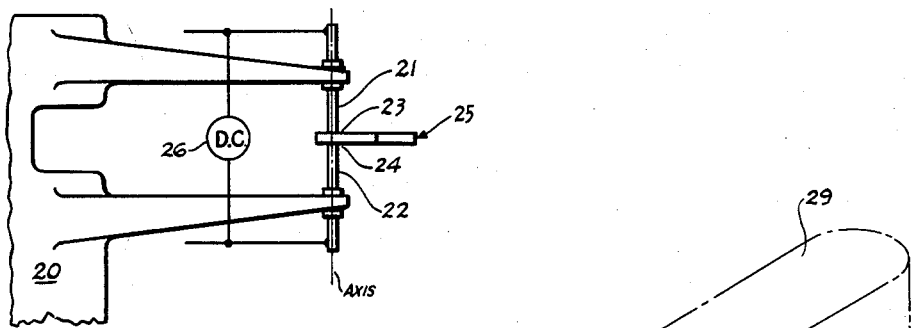
FIG_1
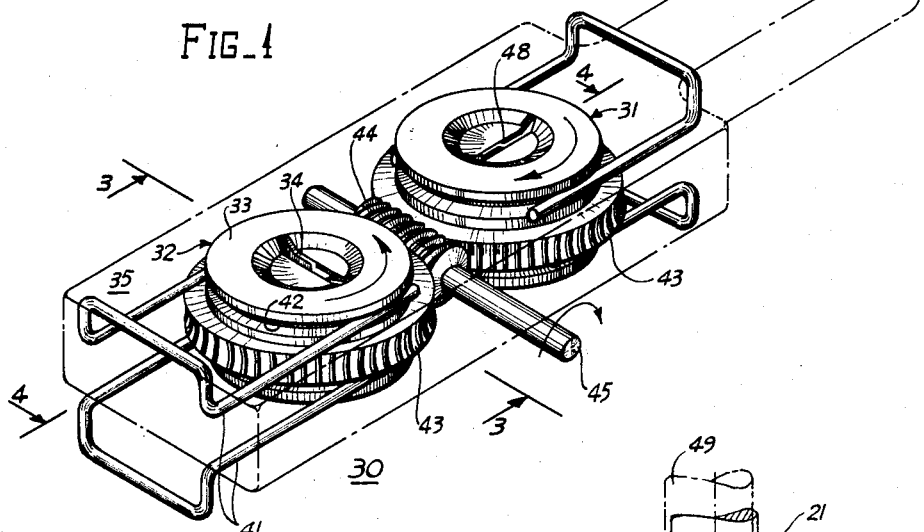
FIG_2
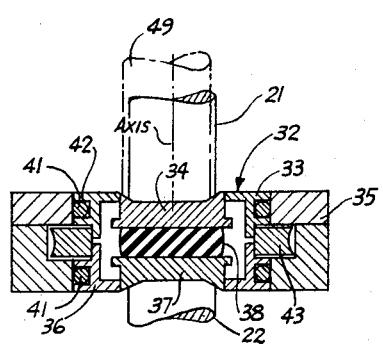
FIG_3
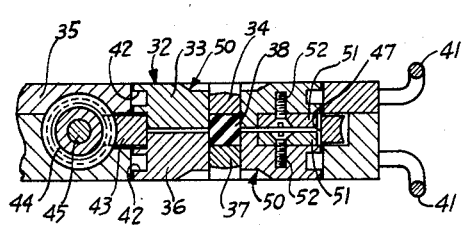
FIG_4
INVENTOR.
BERN R. SWARTS.
BY
Walter J. Jason
ATTORNEY.

March 29, 1960     B. R. SWARTS     2,930,289
ELECTRODE DRESSER
Filed Jan. 23, 1956     3 Sheets-Sheet 2
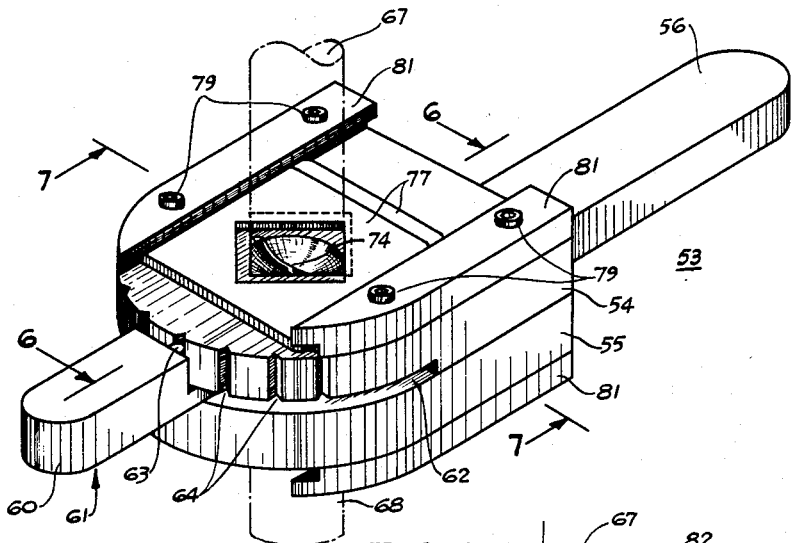
FIG_5
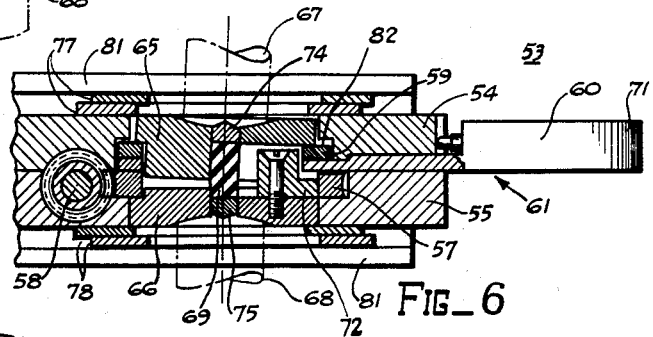
FIG_6
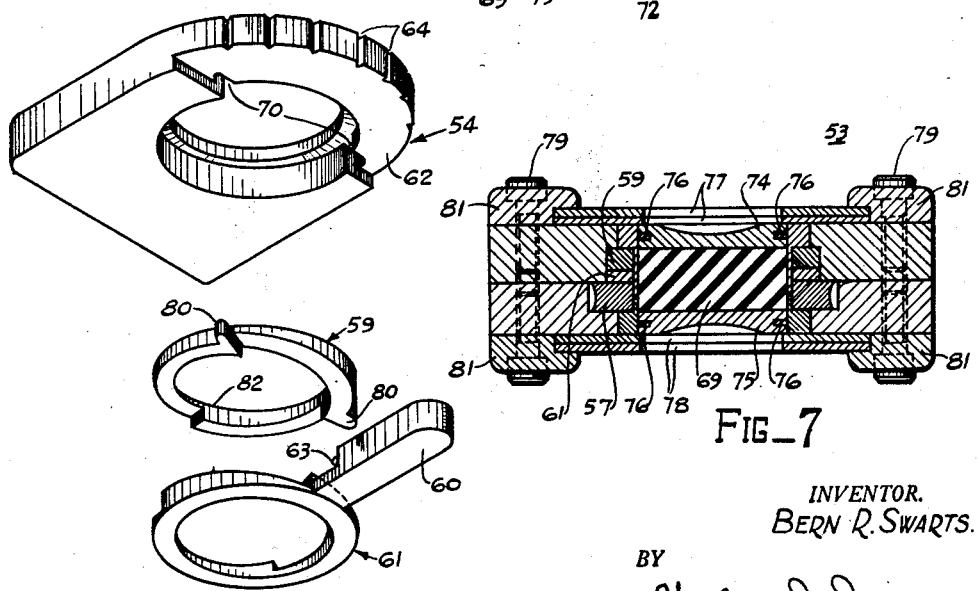
FIG_8
FIG_7
INVENTOR.
BERN R. SWARTS.
BY 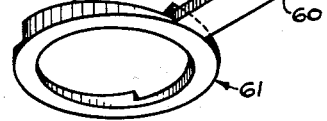
ATTORNEY.

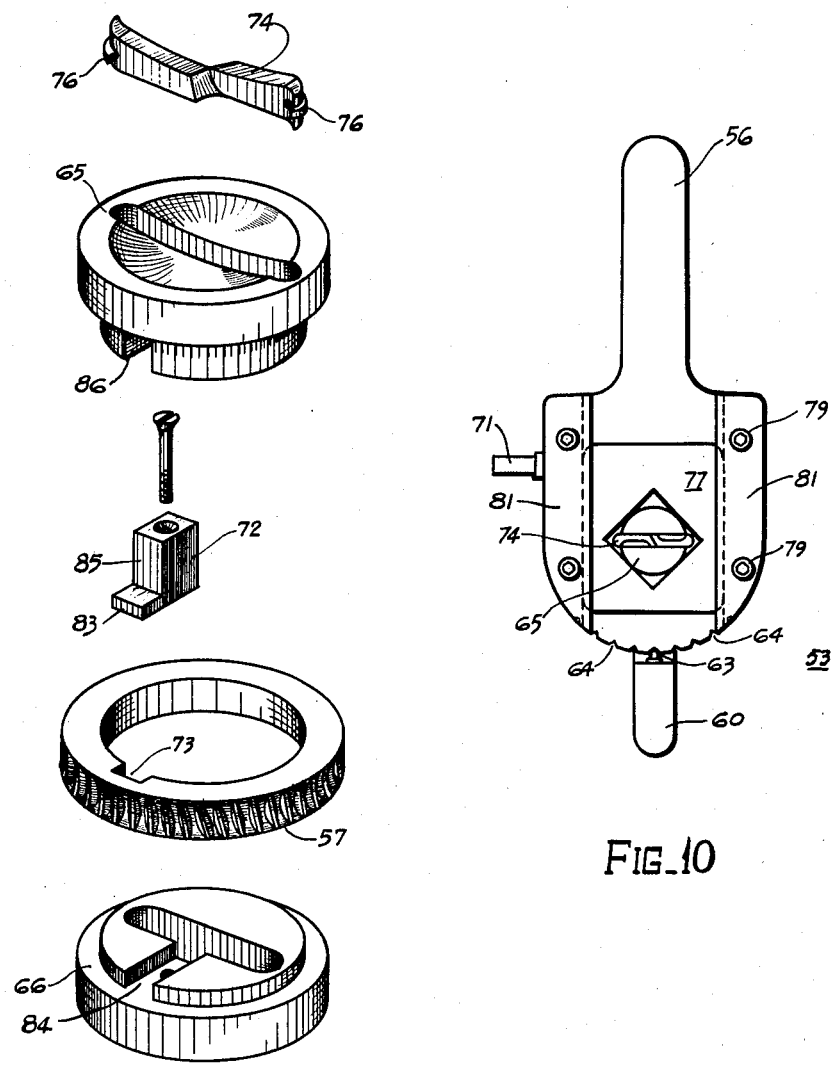

United States Patent Office

2,930,289
Patented Mar. 29, 1960

2,930,289

ELECTRODE DRESSER

Bern R. Swarts, San Diego, Calif., assignor to General Dynamics Corporation, San Diego, Calif., a corporation of Delaware Application January 23, 1956, Serial No. 560,653

6 Claims. (Cl. 90—12)

This invention relates generally to apparatus for dressing welding electrodes, and more particularly to apparatus for dressing electrodes mounted in operating position in a welding machine. Such electrodes, for example, are generally mounted in the machine in vertically spaced apart relation when welding horizontally disposed work.

It is well-known in the art to utilize such resistance welding machines for the production spot and seam welding of assembled parts of products. One of the most significant variables governing the quality and structural integrity of the weld in the assembled product is the electrode welding surface contour of the two opposed electrodes. In addition to the contour, it is also necessary to maintain substantial coaxial alignment of the two opposed contours so that the center portions of the contours are at all times diametrically opposed to each other and normal to the surface of the product being welded.

Present practices to control the contour of the electrodes include the hand dressing of these contours. The comparative inaccuracy of this manual operation results in a non-uniform electrode contour which renders difficult the obtaining of the desired alignment wherein the center portions or pressure points of the electrode contours are perpendicularly aligned with respect to the product or assembly being welded. It is noted also that proper contour and contour alignment is a continuing problem. Following a series of welding operations, the contours become distorted by pitting, arcing, etc., due to use, which results in varying the alignment of the contour pressure points. The operator generally polishes the contours by using a "spinning" or abrasive paddle, which consists of a concave machined metal plate about which is wrapped an abrasive cloth or paper. This is used by the operator to individually dress each electrode in place in the machine, and in this manual dressing operation care must be taken to again shape the electrode contours so that they are in alignment with each other. If the tip conours are very seriously misshaped the operator usually has to reshape the contours by using a file to shape the electrode contours to the proper contour. Such contour is visually determined and each electrode contour is individually shaped. The spinning paddle or abrasive paper or cloth may then be used to smooth any remaining contour roughness. It will be obvious that such a method of dressing the electrode contours primarily depends upon the skill of the particular operator. In addition to contour and alignment, the symmetry of the electrode may be inaccurate, thereby in effect destroying the optimum contour of the pressure points and the axial alignment of the opposing electrode contours.

Inaccurate contour, poor contour symmetry, and slight pressure point misalignment results in rather serious variation of the electric current necessary to form and maintain the welding arc, and causes a variation of the compressive stresses at the weld interface of the assembly being welded during fusion and solidification of the weld nugget. The present invention eliminates the undesirable variations present in the prior art by effecting a simultaneous dressing of both the opposed electrode contours while the electrodes are in place in the welding machine. By this means the finally dressed contours will be both symmetrical and with their pressure points in proper axial alignment, and in perpendicular alignment with the assembly being welded. Further, the invention contemplates utilization of a variety of dressing cutters to accommodate electrodes of various shapes and sizes.

Accordingly, it is an object of this invention to provide unique apparatus for simultaneously effecting the shaping or dressing of opposed welding electrodes.

It is another object of this invention to provide novel apparatus for dressing opposed machine mounted electrodes simultaneously to effect axial alignment and shaping of the opposed contours of the electrodes.

Another object of this invention is the provision of improved apparatus for dressing electrodes, which apparatus provides a positive coaxial contour alignment between the upper and lower electrodes.

It is another object of this invention to reduce considerably the time necessary to dress the aforesaid electrodes.

Yet another object of this invention is to provide a novel electrode dresser for achieving in-place dressing and polishing of the opposed electrodes of a spot-welding machine.

It is another object of this invention to provide a means for dressing in place any combination of upper and lower electrode sizes to desired contours.

A further object of this invention is to provide apparatus for effecting controlled shaping and aligning of electrodes to achieve improved weld quality.

It is another object of this invention to provide an apparatus which can be utilized by an unskilled person to achieve precision alignment and shaping of opposed electrode contours.

Other objects and features of the present invention will be readily apparent to those skilled in the art from the following specification and appended drawings wherein is illustrated a preferred form of the invention, and in which:

Figure 1 is a schematic representation showing the invention being utilized to dress machine mounted opposed spot welding electrodes;

Figure 2 is a phantom view in perspective of one embodiment of the present invention;

Figure 3 is an enlarged cross-sectional view taken along line 3—3 of Figure 2;

Figure 4 is a view in section taken along line 4—4 of Figure 2;

Figure 5 is a perspective view showing another embodiment of the invention;

Figure 6 is a view in section along line 6—6 of Figure 5;

Figure 7 is a view in section along line 7—7 of Figure 5;

Figure 8 is an exploded perspective view of the alignment compensating apparatus of the embodiment shown in Figure 5;

Figure 9 is an exploded perspective view of one of the cutters, and the housing and drive mechanism therefor, of the embodiment shown in Figure 5; and Figure 10 is a plan view of the embodiment shown in Figure 5.

Referring with greater particularity to the drawings, Figure 1 illustrates schematically a spot welding machine 20 which has welding electrodes 21 and 22 mounted in opposed relation with their respective contours or pressure points 23 and 24 in operating position facing each other. In ordinary spot welding operations parts to be assembled by welding are placed intermediate contours 23 and 24 in a position similar to that shown for assembly 25 in Figure 1. A usual direct current source 26 furnishes a direct current which due to the electrical resistance of the parts to be assembled creates very high temperatures within these parts thereby fusing them together. Such spot welding techniques, as described above, are well-known in the art, as is the general fact that the nugget formed between the interfaces of these parts at the point where the parts are fused together is the holding strength of the weld. Therefore, it is highly desirable to provide the opposed electrodes 21 and 22 with predetermined uniform contours 23 and 24 symmetrical with each other and in axial alignment so as to promote a consistently uniform weld nugget upon the pressing together of the parts to be assembled.

Concentricity of the opposed contours 23 and 24, and axial alignment of the centers of the contours 23 and 24, are of vital importance to the formation of the proper nugget for various reasons, including minimizing of the heat required in the nugget formation. It will be obvious to one skilled in the art that excessive heating would misshape the nugget and possibly burn a hole completely through the parts to be assembled.

Effecting and maintaining the desired working surfaces or contours 23 and 24 on electrodes 21 and 22, while simultaneously providing symmetry and axial alignment of the electrode contours, is achieved by apparatus 30, as illustrated in Figure 2. The apparatus 30, which embodies a handle 29 for convenient use by the operator, includes a pair of dressing means or cutter assemblies 31 and 32 which are adapted, respectively, to shape and polish electrodes 21 and 22 to the desired contour. It is noted that each of assemblies 31 and 32 also effects axial alignment and concentricity of the contours while dressing or polishing them, as will be described in greater detail hereinafter.

Cutter assembly 32 includes a circular upper holder 33 which carries an upper cutter 34, and holder 33 is mounted for rotation within a body portion or frame 35 of apparatus 30. Assembly 32 also includes a lower circular holder 36 identical to holder 33 and which carries a lower cutter means or cutter 37, holder 36 and its cutter 37 being in alignment and in spaced apart relationship with holder 33 and cutter 34. Cutters 34 and 37 are also slidably movable outwardly and inwardly within their respective holders, as best illustrated in Figure 3. Intermediate the cutters 34 and 37 is disposed a resilient means 38 made of rubber, plastic, or the like material having a predetermined resilience. As cutters 34 and 37 rotate with holders 33 and 36 within carrying means or frame 35, it will be seen that resilient means 38 will rotate with cutters 34 and 37, urging cutters 34 and 37 outwardly. Resilient means 38 serves to establish and equalize the cutting pressure of cutters 34 and 37 against electrodes 21 and 22 to thereby effect a more uniform cut on both the electrodes.

Cutters 34 and 37 may be made of any desired contour, as required by the shape of electrode tip desired, and it is to be understood therefore that the cutters can be made either concave, convex, or any other shape. It is understood that cutters 34 and 37 are ground with their cutting edges opposite to each other so that a cutting action is achieved when both cutters are rotated in the same direction, as indicated by the arrow of Figure 2.

Holders 33 and 36 are rotatively held within frame 35 by a plurality of spring clamps 41 which are disposed through suitable openings in body 35, and which engage a groove 42 formed in the periphery of each of holders 33 and 36. Holders 33 and 36 are then adapted to be rotatably driven by a main gear 43 which in turn is driven by a worm gear 44 mounted upon a shaft 45. A hand crank or any known type of motor such as an electric, hydraulic, or pneumatic motor (not shown) may be employed to rotate shaft 45, and thus rotate worm gear 44 and main gear 43, which in turn will rotate holders 33 and 36 and their cutters 34 and 37.

In order to achieve the desired axial alignment of the electrode contours, cutters 34 and 37 are axially disposed with respect to each other, their center points 48 lying spaced apart on the same axis, it being again noted that cutters 34 and 37 are adapted to move axially with respect to their holders 33 and 36. This movement is limited only by the action of the resilient means 38 internally and externally by the upper portions of holders 33 and 36. With this construction the cutters may be disposed intermediate the electrodes 21 and 22, just as assembly 30 was disposed, as shown schematically in Figure 3. Lowering of the upper arm of welding machine 20 urges electrodes 21 and 22 against cutters 34 and 37, so that the rotation of the cutters will effect a dressing or cutting operation upon the respective electrodes 21 and 22. It will be evident that in this manner the cutting operation will simultaneously shape the opposed electrodes to the desired contours and effect axial alignment of the concentricity or geometric centers of the contours so cut. It is a notable feature of the present invention that, regardless of the pressure exerted by electrodes 21 and 22 against holders 33 and 36, the depth of cut or bite by cutters 34 and 37 is not affected but is instead controlled by the resilience or shore hardness of the particular resilient means 38 employed. But for this fact the heavy weight of the upper electrode supporting structure might urge the electrodes so forcefully into the cutters that an undesirable chattering and gouging cutting action would result.

Cutter assembly 31, Figure 2, is substantially identical to assembly 32, and is driven by the same worm gear 44. Assembly 31 includes a resilient means which is not as hard or stiff as resilient means 38 of assembly 32 so that assembly 31 is adapted to perform a fine dressing or polishing operation, whereas the assembly 32 with the greater stiffness will be used to effect the rough or major cutting operation. The fine dressing provided by assembly 31 is thus adapted to remove whatever rough burrs may have been left by the major cutting operation of means 32.

It is to be understood that the present invention is also adapted to dress electrodes which are for some reason in slight axial misalignment. For example, an upper electrode 49 is illustrated in Figure 3 in phantom outline in a position somewhat displaced from axial alignment with lower electrode 22. The opposed dressing means 32, however, will still effect the desired axial alignment of the contours cut upon the respective electrodes 49 and 22 by virtue of the axial alignment of cutters 34 and 37.

Figure 4 shows the mechanical relationship between the worm gear 44 and the main gear 43. A pair of keys 51 are attached, respectively, to holders 33 and 36 by a pair of fasteners or screws 52, and keys 51 project into a vertical cut out portion or keyway 47 in main gear 43 so that holders 33 and 36 are caused to rotate upon rotation of gear 43. This construction also permits convenient disassembly of apparatus 30 for access to the cutters, if desired.

Figures 5 through 10 illustrate a second embodiment of the present invention which is adapted, among other things, to effect both a shaping and a polishing operation with a single pair of cutters, as will be described.

The second embodiment, indicated generally by the numeral 53, is, like apparatus 30 above described, adapted to dress the contours or pressure points of the electrodes of a spot welding machine, particularly a spot welding machine of the type wherein the upper arm is pivoted and swings in an arc into opposed relation with a stationary lower arm of the machine. Ordinarily parts to be assembled by spot welding are fairly thin in across section, and in order to achieve the desired axial alignment of the opposed electrodes for spot welding such thin parts, it will be apparent that some provision must be made in the dressing apparatus to compensate for the angular axial displacement of the electrodes created by the greater cross-sectional thickness of the dressing apparatus which is inserted between the electrodes. The manner in which this compensation is accomplished by apparatus 53 will become more apparent hereinafter.

Apparatus 53 comprises, generally, an upper frame member 54 and a lower frame member 55, member 55 having an integral handle 56 for convenient handling of apparatus 53 by the operator. Members 54 and 55 are centrally bored and cut away to accommodate a main gear 57 which meshes with a worm gear 58, and a pair of camming members 59 and 61, as best illustrated in Figures 6, 7 and 8. Camming member 61 embodies an integral handle 60 which is arcuately movable within a slot 62 provided in the under surface of upper frame member 54. The adjusted position of member 61 is maintained by a spring biased detent member 63 which is adapted to mate with any one of a plurality of vertical mating notches 64 which are cut into the periphery of upper frame member 54 at one end thereof.

It will be apparent from an examination of Figure 8 that during movement of camming member 61, camming member 59 is restrained against axial rotation by the engagement of lugs 80 thereof in slots 70 of member 54, and that movement of camming member 61 in one direction will raise member 59, while movement of member 61 in the opposite direction will cause member 59 to be lowered. In this manner the relative height of an upper cutter holder 65 which is adjacent to member 59 will be changed with respect to the position of a lower cutter holder 66, which is located adjacent to the lower surface of gear 57. These holders 65 and 66 are rotatable within normally aligned, central cutout portions of camming members 59 and 61, holder 66 resting against the lower face of main gear 57, while holder 65 rests upon the upper face of camming member 59. Cutters 74 and 75 which are carried by holders 65 and 66 are spaced apart by a resilient member 69 which also biases the cutters outwardly into cutting engagement with electrodes 67 and 68, the stiffness or shore hardness of resilient member 69 being chosen to provide the cutting pressure desired. Cutters 74 and 75 are similar in construction to the cutters 34 and 37 of the first embodiment above described, but are concave in elevational cross section, as are holders 65 and 66. This demonstrates the versatility of the present invention in its capability to cut electrodes to various predetermined contours. As is apparent the cutting edges of cutters 74 and 75 are arranged oppositely so that a cutting is achieved upon the common rotation of the cutters.

The above construction permits holders 65 and 66 to bear the full weight of the supporting structure for electrodes 67 and 68 without affecting the depth of cut taken by upper cutter 74 or by the lower cutter 75. More specifically, as the electrodes bear against holders 65 and 66, cutters 74 and 75 will be exposed to an extent dictated by the relative positions of camming members 59 and 61, as adjusted by handle 60. The farther apart the outward surfaces of members 59 and 61 are, the less of cutters 74 and 75 will be exposed, and the lighter the dressing cut will be. Thus, either a heavy shaping operation or a light dressing operation upon the electrodes may be effected merely through movement of handle 60.

The action of resilient member 69 is designed to establish, by the stiffness or resilience chosen, a certain cutting pressure, and, as above described, this cutting pressure may in turn be altered by operating handle 60.

Apparatus 53 is driven by a motor or the like (not shown), as above described in connection with apparatus 30, acting upon shaft 71. Shaft 71 turns worm gear 58, thereby effecting rotation of main gear 57, and holders 65 and 66 through an arrow-shaped coupling key 72, Figure 9. Key 72 is carried at its outer end 83 within a keyway 73 of main gear 57, and is suitably secured by screw means to lower cutter 66 within channel 84. The upper end 85 of key 72 fits within slot 86 of upper cutter 65. Thus, upon rotation of main gear 57 the desired rotation of both holders 65 and 66 is caused.

Rubber inserts 76 or the like are provided in the ends of cutters 74 and 75 and bear against inner surfaces of their associated holders so that the cutters may not be inadvertently lost by falling out of the holders upon disassembly of apparatus 53.

Apparatus 53 is maintained in operative position between electrodes 67 and 68 by the gripping action of a pair of upper plates 77 located on the upper surface of camming member 61, and by a pair of lower plates 78 on the lower surface of lower frame member 55. Plates 77 and 78 also assist in retaining cutters 74 and 75 in proper position, cutters 74 and 75 being limited in their outward movement by plates 77 and 78. Both plates 77 and 78 are each provided with a central diamond-shaped cutout portion through which an electrode may be disposed. Then, upon relative movement of associated pairs of plates 77 and 78, a gripping or anchoring effect upon the electrodes will be achieved. This anchoring action is particularly desirable where the configuration of the holders and cutters is concave or the like, as compared to the configuration of cutters 34 and 37 of the first embodiment. That is, but for the plates 77 and 78, it is possible that the electrodes to be dressed might undesirably "ride up" a concave contour and out of proper position for dressing by cutters 74 and 75.

It is also possible through the use of plates 77 and 78 to cut properly aligned and opposed contours on electrodes which are, by reason of cramped working space or other environmental factors, disposed at an angle to each other, as at a 45 degree angle. Plates 77 and 78 are adapted to grasp the electrodes, as previously described, whereby the cutting action by cutters 74 and 75 may be obtained. Further, where it is desired to shape electrode contours so that the centers or pressure points thereof are located off center, that is, not in alignment with the electrode body, but in alignment with each other, plates 77 and 78 are adapted to hold apparatus 53 off center with respect to the electrodes. Such an off center arrangement of electrode pressure points is often useful in obtaining a weld up close to a vertical obstruction or the like. In effect, the weld is achieved at the sides of the electrodes.

A plurality of machine bolts 79 are provided to urge a plurality of spaced side clamps 81 against the pairs of plates 77 and 78, as illustrated, to thereby maintain the gripping action as desired.

It is to be particularly noted in the operation of apparatus 53 that the upper surface 82 of camming member 59 is ground at an angle to the horizontal to compensate for the usual angular condition of electrode 67 which exists where the electrodes are a part of a welding machine having a pivotal upper arm. This angle in upper surface 82 of camming member 59 is most apparent in Figure 6, where it is somewhat exaggerated for clarity of illustration. The angle in surface 82 may be altered through the use of various camming members 59 having different angles whereby the electrodes of spot welding machines having pivot arms of various lengths may be accommodated. In this manner the cutting action of upper cutter 74 will be normal to electrode 67 so that the dressed contour of electrode 67 will precisely mate with the contour of electrode 68 when welding the usual thin materials. The adjustment of the cutting pressure of the cutters 74 and 75 against electrodes 67 and 68 permits apparatus 53 to be employed for either heavy cutting operations, such as for the shaping of the electrode, or for lighter cutting operations, such as are required for intermittent dressing of the electrodes during usage thereof.

While certain preferred embodiments of the invention have been specifically disclosed, it is understood that the invention is not limited thereto as many variations will be readily apparent to those skilled in the art and the invention is to be given its broadest possible interpretation within the terms of the following claims:

What I claim is:

1. Portable apparatus for dressing generally axially aligned spot welding electrodes comprising, a first cutter means and a second cutter means, each of said cutter means including a cutter and a cutter holder, retaining means for mounting said cutter in said holder and in such manner that said cutter is free to rock and move axially with respect to said holder and is restrained from rotational movement relative to said holder, a mount for rotatively carrying said first and second cutter means in outwardly facing spaced apart relation to each other, resilient means disposed intermediate and adjacent said first and second cutter means for resiliently causing equalization of the opposed first and second cutter means, and means for simultaneously rotating said cutter means.

2. Portable apparatus for dressing generally axially aligned spot welding electrodes comprising, a first cutter means and a second cutter means, each of said cutter means including a cutter and a cutter holder, retaining means for mounting said cutter in said holder in such manner that said cutter is free to rock and move axially with respect to said holder and is restrained from rotational movement relative to said holder, a mount for rotatively carrying said first and second cutter means in outwardly facing spaced apart relation to each other, adjustable means disposed intermediate and adjacent said first and second cutter means for adjusting the axial spacing between said holders, means engaging said cutters and resiliently causing equalization of pressure of the opposed first and second cutter means against said electrodes, and means for simultaneously rotating said cutter means.

3. Portable apparatus according to claim 2 wherein the adjustable means includes a rotatable cam element for adjusting the depth of cut of the cutters.

4. Portable apparatus for dressing generally axially aligned spot welding electrodes and forming predetermined electrode contours, said apparatus comprising, a first cutter means and a second cutter means, each of said cutter means including a cutter and a cutter holder, retaining means for mounting said cutter in said holder in such manner that said cutter is free to rock and to move axially with respect to said holder and is restrained from rotational movement relative to said holder, each of said holders presenting an outwardly facing concavity complementing the electrode contour, a mount for rotatively carrying said first and second cutter means in outwardly facing spaced apart relation to each other, resilient means disposed intermediate and adjacent said first and second cutter means for resiliently causing equalization of the opposed first and second cutter means, and means for simultaneously rotating said cutter means to thereby effect concurrent shaping of the contours and axially aligning the concentricities of the contours.

5. Portable apparatus for dressing generally axially aligned spot welding electrodes comprising, a first cutter means and a second cutter means, a mount for rotatively carrying said first and second cutter means in outwardly facing spaced apart relation to each other, resilient means disposed intermediate and adjacent said first and second cutter means for resiliently causing equalization of the opposed first and second cutter means, means for simultaneously rotating said cutter means, and a pair of plates outwardly disposed in slidable relation on each of the opposing sides of said mount outwardly from and positioned over said cutter means, each of said plates having a generally diamond shaped aperture to receive an electrode therethrough, said pair of plates being adjustable with respect to each other to clamp the electrode extending through said apertures.

6. A portable tool including a first apparatus and a second apparatus horizontally spaced from said first apparatus, each of said apparatus being adapted to dress generally axially aligned spot welding electrodes and comprises, a first cutter means and a second cutter means, each of said cutter means including a cutter and a cutter holder, the cutter being loosely carried in the holder and being free to move axially with respect to the holder and restrained from rotational movement relative to the holder, a mount for rotatively carrying said first and second cutter means in outwardly facing spaced apart relation to each other, resilient means disposed intermediate and adjacent said first and second cutter means for resiliently causing equalization of the opposed first and second cutter means, and means concurrently driving the first and second apparatus for simultaneously rotating said cutter means, said resilient means of said first apparatus having a predetermined stiffness and said resilient means of said second apparatus having a stiffness less than said predetermined stiffness, whereby said first apparatus effects coarse dressing of said electrodes and said second apparatus effects fine dressing of said electrodes.

References Cited in the file of this patent

UNITED STATES PATENTS

| | | |
|---|---|---|
| 1,195,774 | Brown | Aug. 22, 1916 |
| 2,300,173 | Platz | Oct. 27, 1942 |
| 2,418,767 | Hall | Apr. 8, 1947 |
| 2,587,132 | Finke | Feb. 26, 1952 |
| 2,629,990 | Tocci-Guilbert | Mar. 3, 1953 |
| 2,748,547 | Davies et al. | June 5, 1956 |